(12) United States Patent
Suzuki et al.

(10) Patent No.: US 8,028,716 B2
(45) Date of Patent: Oct. 4, 2011

(54) PRESSURE-REDUCING VALVE

(75) Inventors: Takuya Suzuki, Anjo (JP); Hidetoshi Fujiwara, Nukata-gun (JP); Toshihiko Shima, Okazaki (JP); Munetoshi Kuroyanagi, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 430 days.

(21) Appl. No.: 11/718,983

(22) PCT Filed: Nov. 8, 2005

(86) PCT No.: PCT/JP2005/020412
§ 371 (c)(1),
(2), (4) Date: May 10, 2007

(87) PCT Pub. No.: WO2006/051767
PCT Pub. Date: May 18, 2006

(65) Prior Publication Data
US 2008/0105840 A1 May 8, 2008

(30) Foreign Application Priority Data

Nov. 12, 2004 (JP) ................................. 2004-329299
Feb. 10, 2005 (JP) ................................. 2005-033892

(51) Int. Cl.
*F16K 31/122* (2006.01)
(52) U.S. Cl. ....... 137/505.42; 92/250; 92/257; 251/63.5
(58) Field of Classification Search .............. 137/505.42; 92/250, 257; 251/63.5, 63.6
See application file for complete search history.

(56) References Cited

U.S. PATENT DOCUMENTS

| 2,043,424 | A | * | 6/1936 | Campbell | 277/445 |
| 2,388,422 | A | * | 11/1945 | Krastel | 92/249 |
| 2,398,910 | A | * | 4/1946 | Pontius | 92/156 |
| 2,731,975 | A | * | 1/1956 | Boals | 137/116.5 |
| 2,756,748 | A | * | 7/1956 | Ferguson | 604/222 |
| 3,046,621 | A | * | 7/1962 | Morton | 92/128 |
| 3,567,289 | A | * | 3/1971 | Kawabe | 303/9.73 |
| 4,520,846 | A | * | 6/1985 | Dixon | 137/625.3 |
| 6,478,046 | B2 | * | 11/2002 | Gabrel | 137/505.42 |
| 2002/0003222 | A1 | * | 1/2002 | Fukano et al. | 251/63.5 |

FOREIGN PATENT DOCUMENTS

| JP | 56 90442 | 7/1981 |
| JP | 63-146294 | 9/1988 |
| JP | 63 230947 | 9/1988 |
| JP | 03-107633 | 5/1991 |
| JP | 2003 99131 | 4/2003 |
| JP | 2004 192462 | 7/2004 |

* cited by examiner

*Primary Examiner* — Stephen M Hepperle
*Assistant Examiner* — William McCalister
(74) *Attorney, Agent, or Firm* — Oblon, Spivak, McClelland, Maier & Neustadt, L.L.P.

(57) ABSTRACT

An annular mating portion extends from a fastening surface of a fastening nut. The mating portion has an inner diameter set to be substantially equal to an outer diameter of the portion of a piston in which an accommodating groove is formed. In a state in which the mating portion is inserted into the accommodating groove, and an inner circumferential surface of the mating portion slides in contact with a circumferential wall of the accommodating groove, the fastening nut is mated with a threaded portion, and a lip seal is held between the mating portion and the accommodating groove. This fixes the lip seal to the piston.

2 Claims, 3 Drawing Sheets

PRESSURE-REDUCING VALVE

FIELD OF THE INVENTION

The present invention relates to a pressure reducing valve used to regulate the pressure of high-pressure gas, such as hydrogen gas for a fuel cell vehicle.

BACKGROUND OF THE INVENTION

This type of a pressure reducing valve (regulator) typically includes an open/close valve arranged between a primary port into which high-pressure gas flows and a secondary port from which the gas is discharged. The open/close valve opens and closes to reduce the pressure (primary pressure) of the high-pressure gas flowing through the primary port to a secondary pressure and discharges the gas with the reduced pressure.

In the prior art, such pressure reducing valves include a piston-type pressure reducing valve. The piston-type pressure reducing valve includes a cylinder arranged downstream from an open/close valve and a piston arranged within the cylinder to a slidable manner and defining a pressure reducing chamber and a pressure regulating chamber within the cylinder. The piston moves in accordance with the pressure difference between the pressure regulating chamber side and the pressure reducing chamber side to open or close the open/close valve. Such a pressure reducing valve is disclosed, for example, in Japanese Laid-Open Patent Publication No. 2004-192462.

The piston-type pressure reducing valve normally includes a seal arranged on the outer circumferential surface of the piston. The seal ensures sealing (hermetic sealing) between the pressure reducing chamber and the pressure regulating chamber. In many cases, an O-ring is used as the seal.

However, for a hydrogen tank used, for example, in a fuel cell vehicle, there is a trend for increasing the pressure (e.g. 70 MPa) to increase storage capacity. A pressure reducing valve for such a hydrogen tank would be subjected to an extremely high gas pressure that is applied to the pressure receiving surface of a piston at the side of the pressure reducing chamber and to the seal. Thus, when the pressure reducing valve uses an O-ring as its seal to ensure sufficient sealing in the same manner as a normal pressure reducing valve, the O-ring must be set at an extremely high compression rate. In this case, the friction between the O-ring and inner circumferential surface of the cylinder increases. This interferes with movement of the piston.

Accordingly, in the prior art, the pressure reducing valve for high-pressure gas conventionally includes an annular seal, or a "lip seal," which has a slide piece (seal lip) that slides in contact with the inner circumferential surface of the cylinder due to the pressuring force of an elastic member. The lip seal is arranged on the outer circumferential surface of the piston to ensure sealing.

For example, the pressure reducing valve 71 shown in FIG. 5 uses a lip seal 72 including a resin ring member 73, which has a U-shaped cross-section, and an elastic member 75. The elastic member 75, which is formed by an annular spring member, has a U-shaped cross-section and is arranged in a recess 74 of the ring member 73. The lip seal 72, which is fitted in an accommodating groove 77 formed on an outer circumferential surface of a piston 76, is fixed to the piston 76 by a fastening force of a fastening nut 81 that is mated with a threaded portion 80 formed on a head portion 78 of the piston 76. The elastic force of the elastic member 75 presses a seal lip 82 of the ring member 73 toward a cylinder inner circumferential surface 83 until coming in contact with the cylinder inner circumferential surface 83. This achieves the sealing between a pressure reducing chamber and a pressure regulating chamber.

However, an engagement portion 84 defined between the threaded portion 80 and the fastening nut 81 needs to have play in the radial direction. In other words, a margin must be provided for engagement of the threads of the threaded portion 80 and the fastening nut 81. Even if the piston 76, the threaded portion 80, and the fastening nut 81 are formed in a manner that they are arranged coaxially, the play results in a backlash. Thus, the piston 76 and the fastening nut 81 may not necessarily be arranged coaxially. In the prior art, taking into consideration such backlash, the outer diameter of the fastening nut 81 is smaller than the outer diameter of the piston 76.

However, to regulate the pressure of ultrahigh-pressure gas as described above, the pressing force for pressing the seal lip 82 against the cylinder inner circumferential surface is also se to be extremely high in correspondence with the gas pressure. Due to the frictional force, the lip seal 72 easily deforms in the axial direction when the piston 76 moves. Repetitive reciprocation of the piston 76 may result in the seal lip 82 becoming caught in the gap formed between the fastening rut 81 and the piston 76. This would interfere with smooth movement of the piston 76 and consequently lower the regulation accuracy of the gas pressure.

SUMMARY OF THE INVENTION

To solve the above problems, it is an object of the present invention so provide a pressure reducing valve that prevents a seal from being caught in a gap and enables highly accurate pressure regulation.

To solve the above problems, a first aspect of the present invention is a pressure reducing valve including an open close valve arranged between a primary port and a secondary port. A cylinder is arranged downstream from the open/close valve. A piston defines a pressure reducing chamber and a pressure regulating chamber in the cylinder and has a pressure regulating surface located at the pressure regulating chamber side and a pressure receiving surface located at the pressure reducing chamber side. The piston slides within the cylinder in accordance with the difference between pressure applied to the pressure regulating surface and pressure applied to the pressure receiving surface to open and close the open/close valve. An annular seal is arranged on an outer circumferential surface of the piston and has a slide piece that slides in contact with an inner circumferential surface of the cylinder due to a pressing force of an elastic member. The seal is fitted in an accommodating groove formed in the outer circumferential surface of the piston and is fixed to the piston by fastening force of a nut mated with a threaded portion formed on a head portion of the piston. The nut includes a mating portion inserted in the accommodating groove to hold the seal with the accommodating groove, and an inner circumferential surface of the mating portion is formed to slide in contact with a circumferential wall of the accommodating groove.

It is preferred that the nut be formed to have an outer diameter substantially equal to an outer diameter of the piston. Further, it is preferred that the nut be formed in a manner that at least the mating portion of the nut has an outer diameter substantially equal to an outer diameter of the piston.

Each of the above structures enables the inner circumferential surface of the mating portion to slide in contact with the circumferential wall of the accommodating groove so as to arrange the nut coaxially with the piston. This enables the nut including the mating portion to have an outer diameter set substantially equal to the outer diameter of the piston. The seal is held between the mating portion and the accommodating groove so that the slide piece of the seal is prevented from being caught in a gap. Further, the nut has an outer diameter set substantially equal to the outer diameter of the piston. This increases the surface that slides in contact with the cylinder, and consequently prevents axial displacement of the piston. As a result, the piston moves smoothly, and the pressure reducing valve enables highly accurate pressure regulation.

A second aspect of the present invention is a pressure reducing valve including an open/close valve arranged between a primary port and a secondary port. A cylinder is arranged downstream from the open/close valve. A piston defines a pressure reducing chamber and a pressure regulating chamber in the cylinder and has a pressure regulating surface located at the pressure regulating chamber side and a pressure receiving surface located at the pressure reducing chamber side. The piston slides within the cylinder in accordance with the difference between pressure applied to the pressure regulating surface and pressure applied to the pressure receiving surface to open and close the open/close valve. An annular seal is arranged on an outer circumferential surface of the piston and has a slide piece that slides in contact with an inner circumferential surface of the cylinder due to pressing force of an elastic member. The seal is fitted in an accommodating groove formed in the outer circumferential surface of the piston and is fixed to the piston by fastening force of a nut mated with a threaded portion formed on a head portion of the piston. A fixing member is inserted in the accommodating groove and fastened by the nut to hold the seal with the accommodating groove. The fixing member is formed to have an outer diameter substantially equal to an outer diameter of the piston.

This structure arranges the fixing member coaxially with the piston irrespective of backlash of the nut. This enables the fixing member to have an outer diameter set substantially equal to the outer diameter of the piston and prevents the slide piece from becoming caught in a gap. This further increases the surface that slides in contact with the cylinder and consequently prevents axial displacement of the piston. As a result, the piston moves smoothly, and the pressure reducing valve enables highly accurate pressure regulation.

A third aspect of the present invention is a pressure reducing valve including an open/close valve arranged between a primary port and a secondary port. A cylinder is arranged downstream from the open/close valve. A piston defines a pressure reducing chamber and a pressure regulating chamber in the cylinder and has a pressure regulating surface located at the pressure regulating chamber side and a pressure receiving surface located at the pressure reducing chamber side. The piston slides within the cylinder in accordance with the difference between pressure applied to the pressure regulating surface and pressure applied to the pressure receiving surface to open and close the open/close valve. An annular seal is arranged on an outer circumferential surface of the piston and has a slide piece that slides in contact with an inner circumferential surface of the cylinder due to pressing force of an elastic member. The seal is inserted in an accommodating groove formed in the outer circumferential surface of the piston and held between the accommodating groove and a fixing member press-fitted to a head portion of the piston so as to be fixed to the piston. The fixing member is formed to have an outer diameter substantially equal to an outer diameter of the piston.

This structure coaxially arranges the fixing member for fixing the seal with the piston. This enables the outer diameter of the fixing member to be substantially equal to the outer diameter of the piston, and prevents the slide piece from becoming caught in a gap. This further increases the surface that slides in contact with the cylinder, and consequently prevents axial displacement of the piston. As a result, the piston moves smoothly, and the pressure reducing valve enables highly accurate pressure regulation.

DETAILED DESCRIPTION OF THE PREFERRED EMBODIMENTS

First Embodiment

A first embodiment of the present invention will now be described with reference to the drawings.

Figure 1:
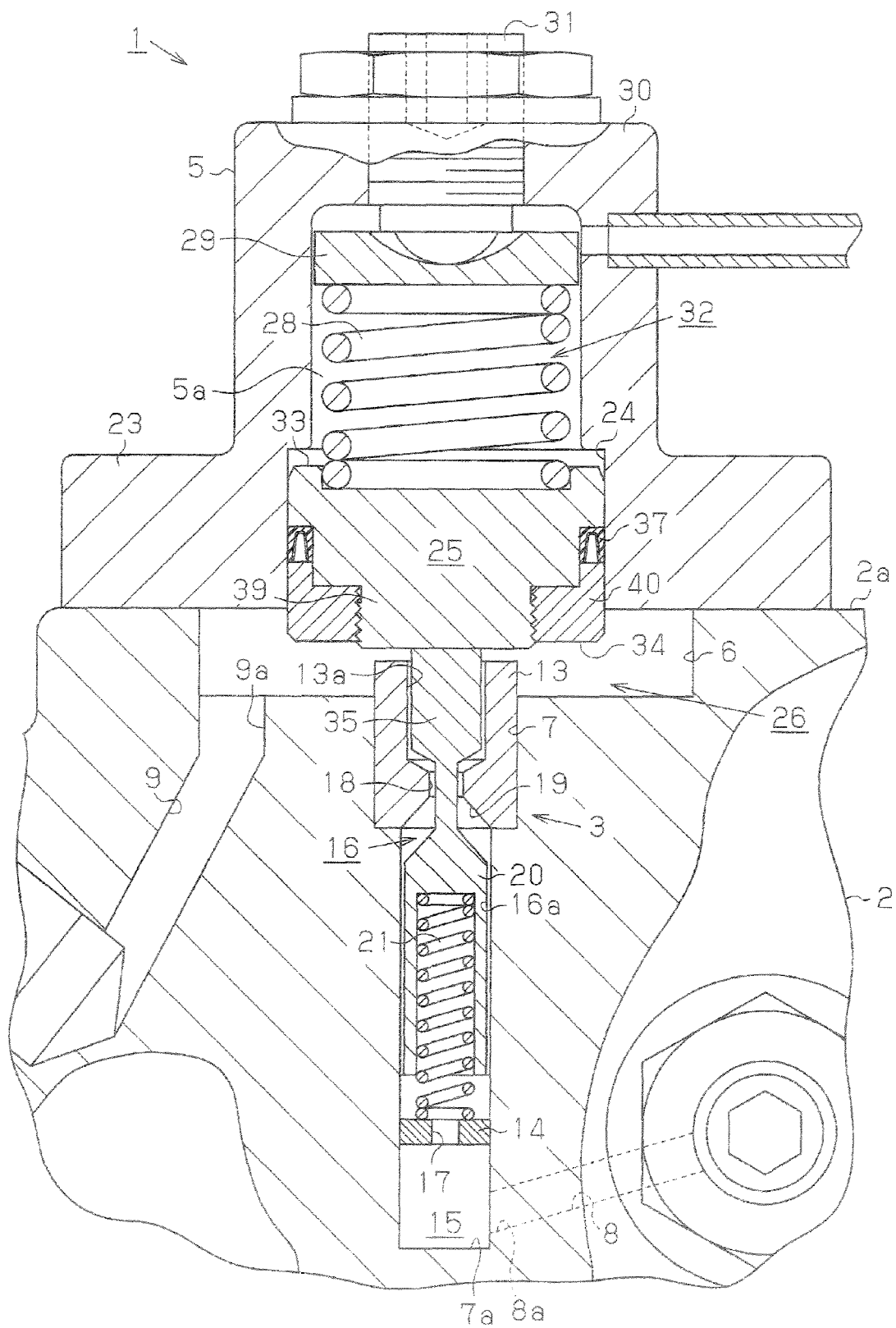
FIG. 1 is a cross-sectional view of a pressure reducing valve according to a first embodiment.

As shown in FIG. 1, a pressure reducing valve 1 (regulator) of the present embodiment is mounted on a plug housing 2 for closing an opening of a high-pressure hydrogen tank. The pressure reducing valve 1 includes a valve mechanism 3 formed in the plug housing 2 and an outer housing 5 or closing an opening of the plug housing 2.

The plug housing 2 includes a first recess 6 and a second recess 7, which is arranged in the center of the first recess 6 and is deeper than the first recess 6. An inlet passage 8, which is in communication with the interior of the hydrogen tank, is formed in a side wall in the vicinity of a bottom surface 7a of the second recess 7. An outlet passage 9, which is in communication with an external supply port, is formed in a bottom surface of the first recess 6. In the present embodiment, an inner end of the inlet passage 8 forms a primary port 8a, and an inner end of the outlet passage 9 forms a secondary port 9a.

Further, a sleeve 13, which is cylindrical, is fixed to the opening side of the second recess 7. A bottom plate 14 is arranged in the vicinity of the bottom of the second recess 7. The space between the bottom plate 14 and the bottom surface 7a of the second recess 7 defines a primary pressure chamber 15, and the space between the sleeve 13 and the bottom plate 14 in the second recess 7 defines a valve chamber 16.

A through hole 17, which communicates the primary pressure chamber 15 with the valve chamber 16, is formed in the bottom plate 14. Hydrogen gas flowing from the inlet passage 8 into the primary pressure chamber 15 flows into the valve chamber 16 via the through hole 17. An inner circumferential wall of the sleeve 13 is formed to have a partially reduced diameter, and a valve hole 18 having a small diameter is formed in the reduced diameter part of the sleeve 13. A valve seat 19 is arranged in the valve hole 18 at the side of the valve chamber 16. A valve member 20 receivable by the valve seat 19 is accommodated in the valve chamber 16. In the present embodiment, the elastic force of a spring 21 urges the valve member 20 in a direction in which the valve member 20 is received by the valve seat 19. When the valve member 20 is spaced from the valve seat 19, hydrogen gas flows from the valve chamber 16 to the first recess 6 via the valve hole 18. When the valve member 20 is received by the valve seat 19, the valve hole 18 closes and stops the outgoing flow of the hydrogen gas. More specifically, the valve hole 18, the valve member 20, and the valve seat 19 form an open/close valve in the present embodiment.

The outer housing 5 is cylindrical and has a closed end. A flange 23 is arranged on the outer circumference of an open portion of the outer housing 5. The flange 23 is fastened to an outer surface 2a of the plug housing 2. This fixes the outer housing 5 to the open end of the first recess 6. As a result, the outer housing 5 closes the opening.

Further, a cylinder 24 is formed in the outer housing 5. A piston 25 is arranged in a slidable manner in the cylinder 24. The cylinder 24 is formed coaxially with the sleeve 13. The piston 25 defines an inner space 5a of the outer housing 5 and the first recess 6.

More specifically, the first recess 6 that is closed by the outer housing 5 and separated from the inner space 5a of the outer housing 5 by the piston 25 forms a pressure reducing chamber 26 in the present embodiment. Hydrogen gas in the valve chamber 16 flows into the pressure reducing chamber 26 through the valve hole 18 of the sleeve 13 and is then discharged through the outlet passage 9, which is in communication with the pressure reducing chamber 26.

A coil spring 28 is arranged in the inner space 5a of the outer housing 5. The coil spring 28 has a lower end, which is in contact with the piston 25. A spring bearing 29 is fixed to an upper end of the coil spring 28. A distal end of an adjustment screw 31, which extends through a bottom portion 30 of the outer housing 5, is in contact with the spring bearing 29. The piston 25 is urged toward the sleeve 13 at the side of the pressure reducing chamber 26 by the elastic force of the coil spring 28.

In the present embodiment, the inner space 5a of the outer housing 5 defines a pressure regulating chamber 32, and an upper surface of the piston 25 defines a pressure regulating surface 33. The piston 25 slides within the cylinder 24 in accordance with the difference between the pressure applied to the pressure regulating surface 33 by the coil spring 28 and the pressure applied to a pressure receiving surface 34 of the piston 25 by hydrogen gas in the pressure reducing chamber 26

Further, a valve stem 35, which is inserted through the valve hole 18, is fixed to the pressure receiving surface 34 of the piston 25. The piston 25 is linked to the valve member 20 by the valve stem 35. In the present embodiment, the valve member 20 and the valve stem 35 are formed integrally. Movement of the piston 25 is transmitted to the valve member 20 by the valve stem 35 so that the valve member 20 is received by or spaced from the valve seat 19 to close or open the valve hole 18. A gap 13a that permits passage of hydrogen gas is formed between the valve stem 35 and the sleeve 13. A gap 16a that permits passage of hydrogen gas is also formed between the valve member 20 and the valve chamber 16. The gaps 13a and 16a are in communication with the valve hole 18.

When the gas pressure of the pressure reducing chamber 26, that is, the pressure applied to the pressure receiving surface 34, is higher than the pressure applied by the coil spring 28 to the pressure regulating surface 33, the piston 25 moves toward the pressure regulating chamber 32. As a result, the valve member 20 is received by the valve seat 19 to close the valve hole 18. This stops the flow of hydrogen gas from the valve chamber 16 into the pressure reducing chamber 26. When the gas pressure applied to the pressure receiving surface 34 is lower than the pressure applied to the pressure regulating surface 33, the piston 25 moves into the pressure reducing chamber 26. As a result, the valve member 20 is spaced from the valve seat 19 to open the valve hole 18. This starts the flow of hydrogen gas from the valve chamber 16 into the pressure reducing chamber 26.

In this manner, the piston 25 slides in accordance with the pressure difference between the pressure regulating surface 33 and the pressure receiving surface 34, and the valve member 20 forming the open/close valve opens and closes the valve hole 18 so that the gas pressure in the pressure reducing chamber 26 is balanced with the pressure applied to the pressure regulating surface 33. As a result, the pressure (secondary pressure) of hydrogen gas discharged through the outlet passage 9 is reduced from the pressure (primary pressure) of the hydrogen tank to the pressure applied to the pressure regulating surface 33.

Structure For Fixing the Seal of the Piston

Next, the structure of the seal of the piston in the pressure reducing valve of the present embodiment will be described.

Figure 2:
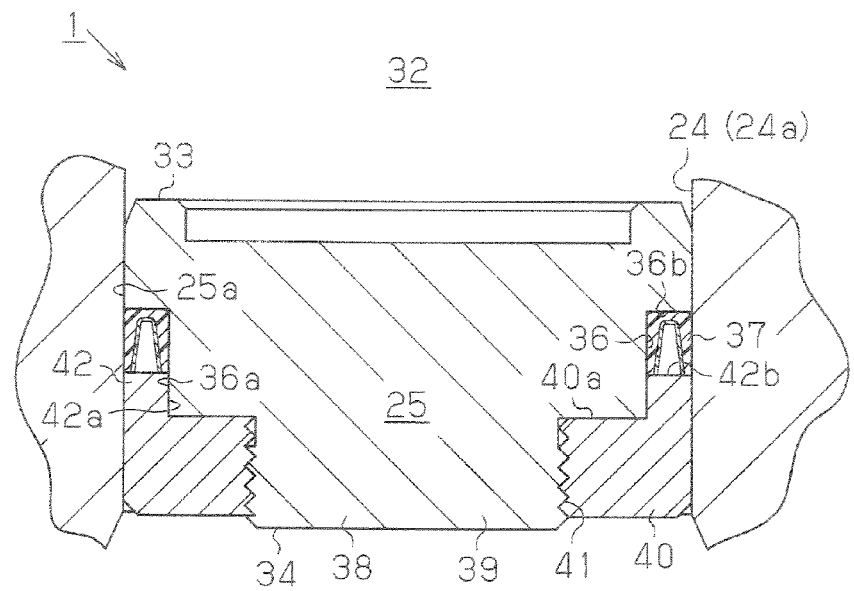
FIG. 2 is a partial cross-sectional view of the pressure reducing valve according to the first embodiment showing a piston and its vicinity.

As shown in FIG. 2, the pressure reducing valve 1 of the present embodiment includes a lip seal 37 that is fitted in an accommodating groove 36 formed on an outer circumferential surface 25a of the piston 25 in the same manner as the pressure reducing valve 71 of the prior art example. A fastening nut 40 is mated with a threaded portion 39 formed on a head portion 38 of the piston 25 having the pressure receiving surface 34. The lip seal 37 is fixed to the piston 25 by the fastening force of the nut 40.

Figure 5:
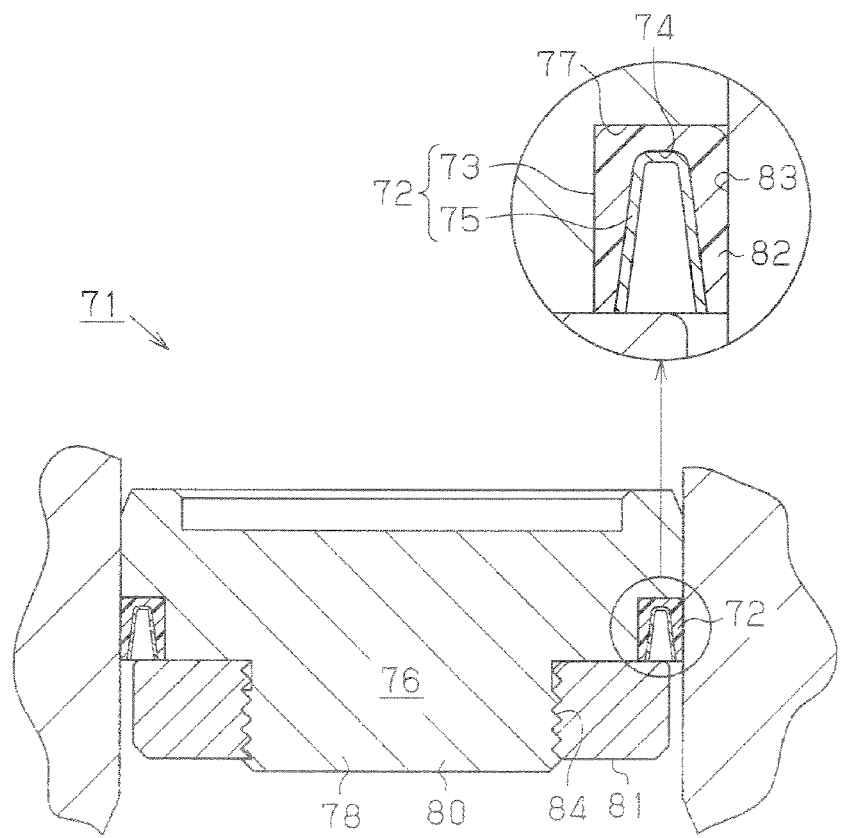
FIG. 5 is a partial cross-sectional view of an example of a pressure reducing valve in the prior art showing a piston and its vicinity.

The lip seal 37 includes a ring-shaped elastic member 75 formed by a plate spring member having a substantially U-shaped cross-section. The elastic force of the elastic member 75 causes a seal lip 82, which serves as a slide piece, to slide in contact with an inner circumferential surface 24a of the cylinder 24. This ensures the sealing between the pressure reducing chamber 26 and the pressure regulating chamber 32 (refer to FIG. 5).

However, as described above, an engagement portion 41 (84) between the threaded portion 39 (80) and the fastening nut 40 (81) needs to have play in a radial direction. Thus, like the pressure reducing valve 71 of the above prior art example, a structure using a normal nut as the fastening nut will have backlash due to the play. As a result, the piston 76 and the fastening nut 81 may not necessarily be arranged coaxially. With the need to consider such backlash, the outer diameter of the fastening nut 81 is required to be set smaller than the outer diameter of the piston 76. As a result, the lip seal 72, or more specifically the seal lip 82 of the lip seal 72, becomes caught in a gap between the fastening nut 81 and the piston 76.

To overcome this problem, the pressure reducing valve 1 of the present embodiment includes an annular mating portion 42 extending from a rim portion of a fastening surface 40a of the fastening nut 40 facing the piston 25. The inner diameter of the mating portion 42 is set to be substantially equal to the outer diameter of the portion of the piston 25 in which the accommodating groove 36 is formed. The fastening nut 40 is mated with the threaded portion 39 in a state in which the mating portion 42 is fitted in the accommodating groove 36 and an inner circumferential surface 42a of the mating portion 42 and a circumferential wall 36a of the accommodating groove 36 slide in contact with each other.

Further, in the present embodiment, the outer diameter of the fastening nut 40 including the mating portion 42 is set to be substantially equal to the outer diameter of the piston 25 (outer diameter necessary for sliding in contact with the cylinder 24). The lip seal 37 is fixed to the piston 25 in a state held between the mating portion 42 and the accommodating groove 36, more specifically, between a distal portion 42b of the mating portion 42 and a bottom surface 36b of the accommodating groove 36. This restricts axial movement of the lip seal 37.

The inner circumferential surface 42a of the mating portion 42 slides in contact with the circumferential wall 36a of the accommodating groove 36 to coaxially mate the fastening nut 40 with piston 25. This enables the outer diameter of the fastening nut 40 including the mating portion 42 to be substantially equal to the outer diameter of the piston 25. The lip seal 37 is then held between the distal portion 42b of the mating portion 42 and the bottom surface 36b of the accommodating groove 36. This prevents the seal lip 82 from being caught in a gap. Further, the outer diameter of the fastening nut 40 is set to be substantially equal to the outer diameter of the piston 25. This increases the surface that slides in contact with the cylinder 24, and consequently prevents axial displacement of the piston 25. As a results the piston 25 moves smoothly, and the pressure reducing valve 1 enables highly accurate pressure regulation.

Second Embodiment

A second embodiment of the present invention will now be described with reference to the drawings. A pressure reducing valve of the present embodiment differs from the pressure reducing valve 1 of the first embodiment described above only in the structure for fixing the seal of the piston. To facilitate description, the components of the present embodiment that are the same as the components in the first embodiment are given the same reference numerals and will not be described.

Figure 3:
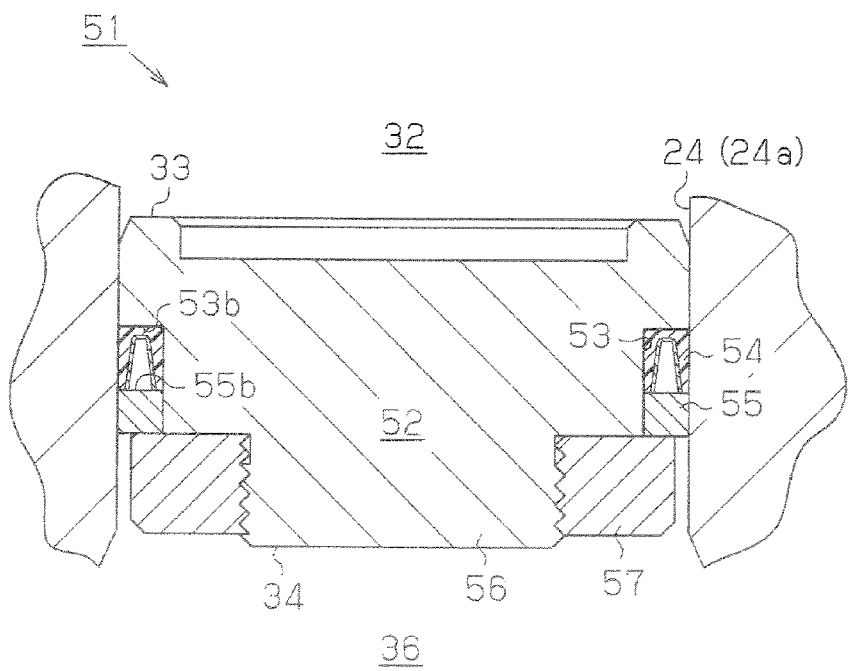
FIG. 3 is a partial cross-sectional view of a pressure reducing valve according to a second embodiment showing a piston and its vicinity.

As shown in FIG. 3, a pressure reducing valve 51 of the present embodiment includes a fixing ring 55, which serves as an annular fixing member, fitted in an accommodating groove 53 of a piston 52 together with a lip seal 54. The lip seal 54 is held between the fixing ring 55 and the accommodating groove 53, more specifically, between a contact surface 55b of the fixing ring 55 and a bottom surface 53b of the accommodating groove 53. The inner diameter of the fixing ring 55 is set to be substantially equal to the outer diameter of a portion of the piston 52 on which the accommodating groove 53 is formed, and the outer diameter of the fixing ring 55 is set to be substantially equal to the outer diameter of a portion of the piston 52 that slides in contact with a cylinder 24. The fastening force of the fastening nut 57, which is mated with a threaded portion 56, fixes the lip seal 54 to the piston 52 with the fixing ring 55. This restricts axial movement of the lip seal 54.

In the pressure reducing valve 51 of the present embodiment, the fixing ring 55, which is fitted in the accommodating groove 53, is arranged separately from the is fastening nut 57, and the lip seal 54 is fixed by the fixing ring 55. This structure enables the fixing ring 55 and the piston 52 to be arranged coaxially by the fixing ring 55 irrespective of backlash of the fastening nut 57. Thus, the outer diameter of the fixing ring 55 may be set to be substantially equal to the outer diameter of the piston 52 to prevent a seal lip 82 from being caught in a gap. This further increases the surface that slides in contact with the cylinder 24, and consequently prevents axial displacement of the piston 52. As a result, the piston 52 moves smoothly, and the pressure reducing valve 51 enables highly accurate pressure regulation.

Third Embodiment

A third embodiment of the present invention will now be described with reference to the drawings. A pressure reducing valve of the present embodiment differs from the pressure reducing valve 1 of the first embodiment described above only in the structure for fixing the seal of the piston. To facilitate description, the components of the present embodiment that are the same as the components in the first embodiment are given the same reference numerals and will not be described.

Figure 4:
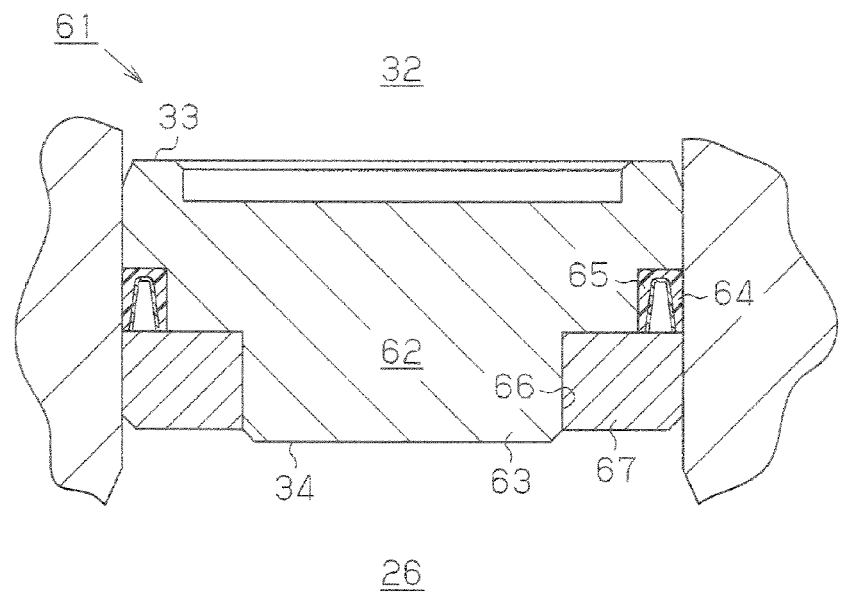
FIG. 4 is a partial cross-sectional view of a pressure reducing valve according to a third embodiment showing a piston and its vicinity.

As shown in FIG. 4 a pressure reducing valve 61 of the present embodiment includes a press-fitting groove 66, which is in communication with an accommodating groove 65 for accommodating a lip seal 64. The press-fitting groove 66 is formed around a head portion 63 of a piston 62 in the vicinity of a pressure receiving surface 34 of the piston 62. A fixing ring 67, which serves as an annular fixing member, is press-fitted in the press-fitting groove 66. The outer diameter of the fixing ring 67 is substantially equal to the outer diameter of a portion of the piston 62 that slides in contact with a cylinder 24. The fixing ring 67, which is press-fitted to the press-flitting groove 66 formed in the head portion 63 of the piston 62, holds the lip seal 64 with the accommodating groove 65 so that the lip seal 64 is fixed to the piston 62. This restricts axial movement of the lip seal 64.

This structure coaxially arranges the fixing ring 67 and the piston 62. This enables the outer diameter of the fixing ring 67 to be set substantially equal to the outer diameter of the piston 62 so as to prevent the seal lip 82 from being caught in a gap. This further increases the surface of the piston 62 that slides in contact with the cylinder 24 and prevents axial displacement of the piston 62. As a result, the piston 62 moves smoothly, and the pressure reducing valve 61 enables highly accurate pressure regulation.

The above embodiments may be modified in the following forms.

Although the present invention is applied to a pressure reducing valve for a high-pressure hydrogen tank arranged on the plug housing 2 of the hydrogen tank in the above embodiments, the present invention may be applied to a pressure reducing valve arranged separately from the plug housing 2.

Although the lip seal accommodated in the accommodating groove is fixed at the side of the pressure receiving surface in the above embodiments, the lip seal may be fixed at the side of the pressure regulating surface.

The invention claimed is:

1. A pressure reducing valve comprising:
    an open/close valve arranged between a primary port and a secondary port,
    a cylinder arranged downstream from the open/close valve,
    a piston defining a pressure reducing chamber and a pressure regulating chamber in the cylinder and having a pressure regulating surface located at the pressure regulating chamber side and a pressure receiving surface located at the pressure reducing chamber side, wherein the outer circumferential surface of the piston has an outer diameter such that the piston slides within the cylinder, with the outer circumferential surface in sliding contact with the cylinder, in accordance with the difference between pressure applied to the pressure regulating surface and pressure applied to the pressure receiving surface to open and close the open/close valve, wherein the outer circumferential surface of the piston has an accommodating groove having a circumferential wall with a constant diameter throughout the axial length of the accommodating groove, and wherein the piston has a threaded portion extending from the accommodating groove;
    an annular lip seal arranged in the accommodating groove and having a slide piece that slides in contact with an inner circumferential surface of the cylinder due to a pressing force of an elastic member; and a nut mated with the threaded portion, the nut including a mating portion inserted in the accommodating groove to hold the lip seal within the accommodating groove, an inner circumferential surface of the mating portion being formed to slide in contact with the circumferential wall of the accommodating groove, the nut further including a fastening surface facing the piston and extending between the threaded portion and the mating portion, the fastening surface engaging the piston to limit further entry of the mating portion into the accommodating groove when the lip seal is axially fixed by the mating portion, wherein the mating portion extends from the fastening surface of the nut, wherein the inner diameter of the mating portion is set to be sufficiently equal to diameter of the circumferential wall of the accommodating groove to provide sliding contact with the circumferential wall of the accommodating groove, and wherein an outer diameter of the mating portion is set to be sufficiently equal to an outer diameter of the piston to provide said sliding contact with the cylinder, whereby mating the nut with the threaded portion until the fastening surface engages the piston causes the mating portion to enter the accommodating groove, in sliding contact with the circumferential wall of the accommodating groove, to axially fix the lip seal in the accommodating groove.

2. The pressure reducing valve according to claim 1, wherein the nut is formed to have an outer diameter equal to the outer diameter of the piston over a length of the nut that exceeds the length of the mating portion.

* * * * *